US008949262B2

(12) United States Patent
Wiese

(10) Patent No.: US 8,949,262 B2
(45) Date of Patent: Feb. 3, 2015

(54) METHOD AND SYSTEM FOR PLANNING THE MAINTENANCE OF AN AUTOMATION INSTALLATION

(75) Inventor: Wilhelm Wiese, Singapore (SG)

(73) Assignee: ABB AG, Mannheim (DE)

( * ) Notice: Subject to any disclaimer, the term of this patent is extended or adjusted under 35 U.S.C. 154(b) by 68 days.

(21) Appl. No.: 13/305,571

(22) Filed: Nov. 28, 2011

(65) Prior Publication Data
US 2012/0197872 A1    Aug. 2, 2012

(30) Foreign Application Priority Data
Nov. 26, 2010  (DE) .......................... 10 2010 052 651

(51) Int. Cl.
*G06F 17/30*    (2006.01)
*G06Q 10/06*    (2012.01)

(52) U.S. Cl.
CPC ..................... *G06Q 10/06* (2013.01)
USPC .......................................................... 707/758

(58) Field of Classification Search
CPC ................... G06F 17/30286; G06F 17/30554; G06F 17/30342
USPC .......................... 707/722, 949, 758
See application file for complete search history.

(56) References Cited

U.S. PATENT DOCUMENTS

| | | | |
|---|---|---|---|
| 2003/0041098 A1 | 2/2003 | Lortz | |
| 2005/0103354 A1* | 5/2005 | Miyauchi et al. | 128/898 |
| 2005/0177533 A1* | 8/2005 | Herzog | 707/1 |
| 2005/0187838 A1* | 8/2005 | Squeglia et al. | 705/29 |
| 2007/0181681 A1* | 8/2007 | Jain | 235/385 |

OTHER PUBLICATIONS

McKone, Kathleen E., Roger G. Schroeder, and Kristy O. Cua. "The impact of total productive maintenance practices on manufacturing performance." Journal of operations management 19.1 (2001): 39-58.*
Yam, R. C. M., et al. "Intelligent predictive decision support system for condition-based maintenance." The International Journal of Advanced Manufacturing Technology 17.5 (2001): 383-391.*
Luxhøj, James T., Jens O. Riis, and Uffe Thorsteinsson. "Trends and perspectives in industrial maintenance management." Journal of manufacturing systems 16.6 (1997): 437-453.*
German Examination Report for DE 10 2010 052 641.7 dated Jun. 7, 2011.

* cited by examiner

*Primary Examiner* — Usmaan Saeed
*Assistant Examiner* — Nan Hutton
(74) *Attorney, Agent, or Firm* — Buchanan Ingersoll & Rooney PC

(57) ABSTRACT

A method and system are disclosed for planning maintenance of an automation installation by monitoring a maintenance state of individual components of the installation, which are connected to one another via a communication network, using life cycle data. The method and system can read device-identifying data from the individual components via the communication network, locate identified components in a current component database containing an item of replacement part availability information, and evaluate replacement part availability information relating to the located components with regard to determining specified procurement actions within the current maintenance interval.

11 Claims, 1 Drawing Sheet

METHOD AND SYSTEM FOR PLANNING THE MAINTENANCE OF AN AUTOMATION INSTALLATION

RELATED APPLICATION(S)

This application claims priority under 35 U.S.C. §119 to European Patent Application No. DE 102010052651.7 filed in Europe on Nov. 26, 2010, the entire content of which is hereby incorporated by reference in its entirety.

FIELD

The disclosure relates to a method and to a system for planning the maintenance of an automation installation by monitoring the maintenance state of the individual components of the automation installation, which are connected to one another via a communication network, using life cycle data.

BACKGROUND INFORMATION

The field of application of the disclosure extends to automation. Automation installations in factory automation, process engineering and the like can include a multiplicity of individual components, for example, handling devices, processing devices, reactor devices, valve units of pipeline systems and other components.

In addition to device-related units, all of these components can include electronic units for operating the component which are connected to a data network of the automation installation. The data network can operate according to a field bus standard. The individual components of the automation installation can be operated in a coordinated manner via this network in order to produce a product which runs through the automation installation.

An aim of planning the maintenance of an automation installation is to keep the individual components ready for operation, for example, to avoid a defect of a component during the ongoing operation of the automation installation. Predictive maintenance is useful for this purpose. In order to plan such maintenance, the maintenance state of each component of the automation installation can be monitored.

Because the individual components can have different failure behaviors, the practice of monitoring the maintenance state can be associated with calculating failure probabilities. Whereas electronic controller units can, for example, operate for fifteen years, the service life of a PC (personal computer) can be restricted to, for example, approximately five years. In order to carry out maintenance in good time, for example to replace a component in danger of failure, the component can be provided with an operating hours counter in the simplest case. When the operating hours counter has reached the predefined service life limit by adding the operating hours, the component can be maintained or replaced.

With this maintenance method, a multiplicity of items of information are evaluated according to the number of components installed in an automation installation. The situation may also arise in which, although it is desired to replace a long-lasting component of the automation installation as a result of the service life limit expiring, a replacement part for this component may no longer be available because the manufacturer is no longer able to supply it owing to product discontinuation, a model change or the like. In order to ensure the availability of replacement parts, in particular for long-lasting components, it would therefore be desirable to procure such replacement parts in good time and to store them. However, only the manufacturer knows the information relating to an availability period of the replacement parts, and precautionary storage can be complicated.

SUMMARY

A method is disclosed for planning maintenance of an automation installation by monitoring a maintenance state of individual components of the installation using life cycle data, the components being connected to one another via a communication network, the method comprising: reading device-identifying data from the individual components via the communication network; locating identified components in a current component database containing an item of replacement part availability information; and evaluating the replacement part availability information relating to the located components with regard to determining a specified procurement action within a current maintenance interval.

A system is disclosed for planning maintenance of an automation installation by monitoring a state of individual components of the installation using life cycle data, the components being connected to one another via a communication network, comprising: an analysis unit for reading device-identifying data from individual components of an automation installation via a communication network to find components identified via life cycle data in a current component database containing an item of replacement part availability information, and for determining a specified procurement action within a current maintenance interval on a basis of replacement part availability information.

A computer readable medium is disclosed storing computer program instructions which when executed by an automation installation computer for monitoring a maintenance state of individual components of the installation using life cycle data, the components being connected to one another via a communication network, causes the computer to perform the following steps: read device-identifying data from the individual components via the communication network; locate identified components in a current component database containing an item of replacement part availability information; and evaluate the replacement part availability information relating to the located components with regard to determining specified procurement actions within a current maintenance interval.

A computer readable medium is disclosed storing computer program instructions which when executed by a computer programmed with the instructions and arranged as an analysis unit in a system for planning maintenance of an automation installation by monitoring a state of individual components of the installation using life cycle data, the components being connected to one another via a communication network, causes the computer to perform the following steps: read device-identifying data from the individual components via the communication network to find components identified via the data in a current component database containing an item of replacement part availability information; and determine a specified procedure action within a current maintenance interval on a basis of the replacement part availability information.

BRIEF DESCRIPTION OF THE DRAWINGS

The features of the disclosure are illustrated in more detail below together with the description of exemplary embodiments of the disclosure using the figures, in which.

DETAILED DESCRIPTION

Figure 1:
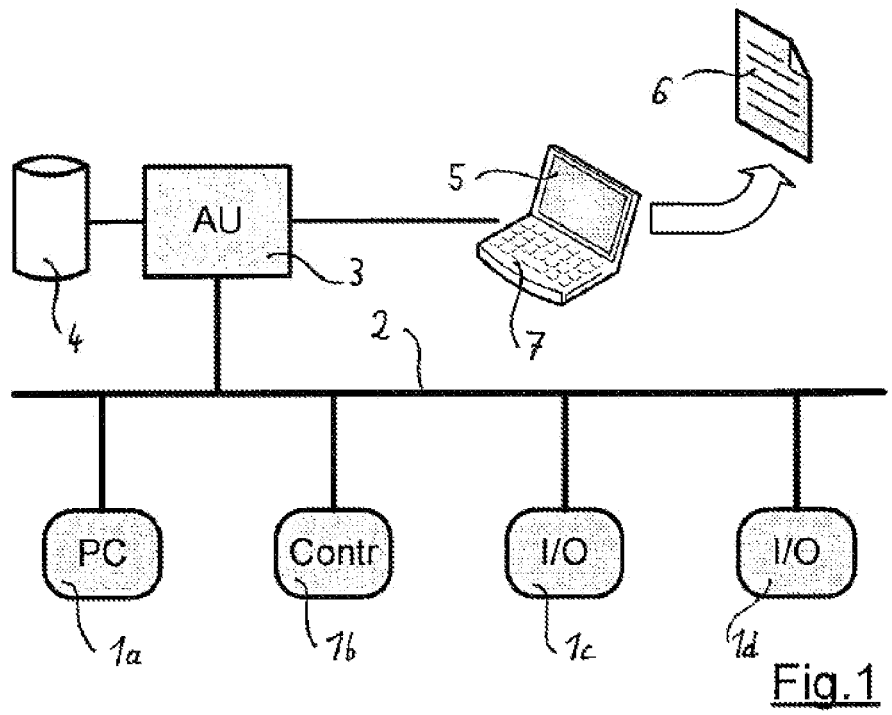
FIG. 1 shows a diagrammatic block diagram of an exemplary embodiment of a system for planning the maintenance of an automation installation.

Exemplary embodiments of the disclosure provide a method and a system for planning the maintenance of an automation installation by monitoring the maintenance state of the individual components. The method can ensure minimal storage of replacement parts by improving the planning reliability.

An exemplary embodiment of the disclosure provides an analysis unit incorporated in a communication network of the components of the installation that reads device-identifying data from the individual components in order to find the components identified via the data in a current component database which assigns an item of replacement part availability information to the component found in each case. Thus, desired or specified (e.g., required) procurement actions can be determined. Such maintenance analysis can be carried out in a pass in maintenance intervals at defined intervals of time, for example once a month.

According to an exemplary embodiment of the disclosure there is a prerequisite for components which are currently still available and whose production will be discontinued by the manufacturer in the near future to be stocked in a sufficient quantity within the scope of the procurement action. This relates, for example, to components whose current availability is shorter than the remaining service life of the automation installation. This can make it possible to ensure that such replacement parts are not ordered prematurely, with the result that stocks can be kept low. In addition, the number of replacement parts for components which will actually be involved in the remaining service life of the automation installation can be calculated in a more accurate manner.

Practices of reading device-identifying data from individual components and evaluating a replacement part availability information relating to the individual components can be carried out using a current component database. This component database can be updated, for example, at least once a month in order to establish temporal synchronicity with the maintenance planning operations which can also be carried out once a month, for example. The component database can contain at least the date of availability of each component as a replacement part from the manufacturer or compatible successor products with associated order information.

So that an item of replacement part availability information can be gathered from the component database, suitable device-identifying data relating to each component in the database can be used as a search indicator for the data record to be assigned, for example, the type of device or the serial number. The data record can also contain additional information, for example, with regard to the name of the manufacturer, the style of device, the date of manufacture, and current software and/or firmware versions in order to uniquely identify the component and to determine its maintenance status.

In an exemplary embodiment according to the disclosure, the analysis unit can display, as a result of maintenance planning which has been carried out, the maintenance status of each component as hardware and possibly also the maintenance status of each item of associated software as well as the IT security status on a monitor. In this case, the IT security status can indicate the efficiency of the measures taken to prevent unauthorized access to a component of the installation from the outside, for example, in the sense of a firewall function which can be implemented by corresponding software.

In an exemplary embodiment according to the disclosure, the analysis unit can also generate, as a result of maintenance planning which has been carried out, an alarm list which can be directly displayed on the monitor and can include information relating to events which are relevant to maintenance, for example: a component is no longer the current product version, for example, the manufacturer has, in the meantime, offered a successor version of the installed component; a component is available from the manufacturer for the last time as a replacement part, for example, the supply of replacement parts for this component by the manufacturer is running out, with the result that the operator of the installation has to stock up with a sufficient number of replacement parts in good time; a component of an older product version has a limited range of functions, for example, although an available successor product can be used in terms of its basic functionality, it is not compatible with the predecessor product in terms of possibly dispensable additional functions; a component must be urgently replaced since it is outdated in terms of the system, for example, the internal operating hours counter signals the maximum service life, with the result that the component is in extreme danger of failure. Replacement with a replacement part can be carried out immediately in order to ensure the operational reliability of the installation.

In an exemplary embodiment according to the disclosure, the analysis unit can generate an alarm list with regard to events which are relevant to maintenance, for example: a component is active, for example, it is currently being produced and developed; a component is classic, that is to say it is currently being produced but development has already been switched to the successor product; a component is limited, for example, it is no longer produced but is still repaired and is distributed from the stock as long as the supply suffices; a component is obsolete, for example, there are no stocks or replacement parts.

In addition, the alarm list can signal further events which are relevant to maintenance and can output this information directly to the maintenance staff with an appropriate instruction. For example, "The component X has reached the service life limit. Please contact the manufacturer ABB using service contact Y to order replacement parts stating the product information Z".

The method according to an exemplary embodiment of the disclosure for planning the maintenance of an automation installation can be implemented as a computer program product, contained, for example, in a non-transitory computer readable medium, the routine for evaluating the replacement part availability information relating to the individual components with regard to determining specified procurement actions within the current maintenance interval being implemented by corresponding control instructions stored in software.

According to FIG. 1, an automation installation can include various components $1a$ to $1d$ which are cited here by way of example. The first component $1a$ can be a PC for carrying out machine control within the installation. The second component $1b$ can be a controller which, as electronic hardware, can control control-related operations with respect to transferring data to other hardware units. In this case, the components $1c$ and $1d$ can be I/O units for forming an interface between a microprocessor-controlled computer unit and the outside world, for example sensors, actuators and other external peripherals.

All of these components 1a to 1d of the automation installation can be connected to a common communication network 2 which can be in the form of a field bus system in this case. A special analysis unit 3 for planning the maintenance of the automation installation can also be connected, inter alia, to the communication network 2.

The analysis unit 3 can be connected to a component database 4 containing replacement part availability information. The analysis unit 3 can be used to read device-identifying data from the individual components 1a to 1d of the automation installation via the communication network 2 in order to then determine possibly desired procurement actions within the current maintenance interval using the respective maintenance status and the replacement part availability information. In this case, such procurement actions can be displayed on a monitor 5 of the analysis unit 3. In addition, the current maintenance status of components 1a to 1d, which can be classified as hardware, can also be displayed on the monitor 5. In addition, the maintenance status of the respective software locally installed in the components 1a to 1d, for example, the current firmware, as well as the IT security status are likewise displayed.

In order to carry out pending maintenance operations, the analysis unit 3 can also generate an alarm list 6 which can list the most urgent information with regard to necessary events which are relevant to maintenance, for example, while naming the component 1a to 1d affected in each case. For example, information regarding whether a component 1a to 1d no longer corresponds to the current product version, is available from the manufacturer for the last time as a replacement part, can be assigned to an older product version which offers only a limited range of functions or should be urgently replaced since it is outdated in terms of the system is thus output in the alarm list 6.

Figure 2:
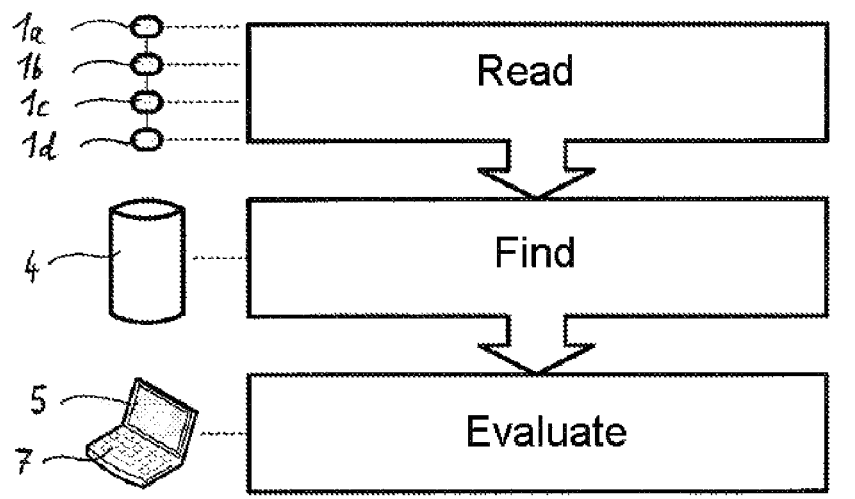
FIG. 2 shows a flowchart of an exemplary embodiment of exemplary main method steps to be run for this purpose.

According to FIG. 2, the maintenance of the automation installation can be planned in the sense according to the disclosure using the following exemplary method steps.

Device-identifying data are first read from the individual components 1a to 1d of the automation installation. The components 1a to 1d which have been identified in this manner can then be found in a component database 4 filled with current replacement part availability information in order to finally evaluate the replacement part availability information relating to the individual components 1a to 1d in order to determine currently specified procurement actions if, for example, a component which is in danger of failure with regard to its maintenance status should be replaced as a precaution in a foreseeable time in order to continue to ensure the operational reliability of the automation installation.

The disclosure is not restricted to the exemplary embodiments described above. Rather, modifications of said exemplary embodiments which are concomitantly included in the scope of protection of the following claims are also possible. For example, it is also possible to monitor more components and other components of the automation installation in the manner according to the disclosure in order to ensure, in a plannable manner, the availability of replacement parts, that the software is up to date and the like.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Symbols
1 Component
2 Network
3 Analysis unit
4 Component database
5 Monitor
6 Alarm list

What is claimed is:

1. A method for planning maintenance of an automation installation by monitoring a maintenance state of individual components of the installation using life cycle data, the components being connected to one another via a communication network, the method comprising:
   reading device-identifying data from the individual components via the communication network;
   locating identified components in a current component database containing an item of replacement part availability information;
   evaluating the replacement part availability information relating to the located components with regard to determining a specified procurement action within a current maintenance interval; and
   generating an alarm list comprising information for all of the following maintenance events:
   a component is no longer a current product version;
   a component is available from a manufacturer for a last time as a replacement part;
   a component of an older product version has a limited range of functions;
   a component is to be urgently replaced as being outdated for the system;
   a component is currently being produced and developed;
   a component is currently being produced but development has already been switched to a successor product;
   a component is no longer produced but is still repaired and is distributed from stock as long as a supply suffices; and
   a component is not available in stock or in a stock of replacement parts.

2. The method as claimed in claim 1, comprising:
   stocking components which are still available and whose current availability is shorter than a remaining service life of the automation installation in a sufficient quantity during the procurement action.

3. The method as claimed in claim 1, comprising:
   reading the device-identifying data from the individual components; and
   evaluating the replacement part availability information relating to the individual components at least once a month using the current component database.

4. The method as claimed in claim 1, comprising:
   displaying a maintenance status of the components of the installation which are to be classified as hardware, of each item of associated software, and an IT security status in a graphic user interface.

5. A system for planning maintenance of an automation installation by monitoring a state of individual components of the installation using life cycle data, the components being connected to one another via a communication network, comprising:
   a processor coupled to a memory arranged as an analysis unit for reading device-identifying data from individual components of an automation installation via a communication network to find components identified via life cycle data in a current component database containing an item of replacement part availability information, and for determining a specified procurement action within a current maintenance interval on a basis of replacement part availability information;
wherein the analysis unit is configured for generating an alarm list comprising information for all of the following maintenance events:
a component is no longer a current product version;
a component is available from a manufacturer for a last time as a replacement part;
a component of an older product version has a limited range of functions;
a component is to be urgently replaced as being outdated for the system;
a component is currently being produced and developed;
a component is currently being produced but development has already been switched to a successor product;
a component is no longer produced but is still repaired and is distributed from stock as long as a supply suffices; and
a component is not available in stock or in a stock of replacement parts.

6. The system as claimed in claim 5, comprising:
a graphic user interface for displaying a maintenance status of components of an automation installation which are to be classified as hardware, of each item of associated software and an IT security status.

7. The system as claimed in claim 5, wherein the replacement part availability information indicates at least a date until which a manufacturer is able to provide the component as a replacement part.

8. The system as claimed in claim 5, wherein the device-identifying data relating to the components are at least one of a name of a manufacturer, a style of device, a type of device, a serial number, a date of manufacture, and a current software and/or firmware version.

9. The system as claimed in claim 5, wherein components of the automation installation include at least one of a PC, a server, a workstation, a controller, and an I/O component.

10. A non-transitory computer readable medium storing computer program instructions which when executed by a computer programmed with the instructions and arranged as an analysis unit in a system for planning maintenance of an automation installation by monitoring a state of individual components of the installation using life cycle data, the components being connected to one another via a communication network, causes the computer to perform the following steps:
read device-identifying data from the individual components via the communication network to find components identified via the data in a current component database containing an item of replacement part availability information;
determine a specified procedure action within a current maintenance interval on a basis of the replacement part availability information;
generate an alarm list comprising information for all of the following maintenance events:
a component is no longer a current product version;
a component is available from a manufacturer for a last time as a replacement part;
a component of an older product version has a limited range of functions;
a component is to be urgently replaced as being outdated for the system;
a component is currently being produced and developed;
a component is currently being produced but development has already been switched to a successor product;
a component is no longer produced but is still repaired and is distributed from stock as long as a supply suffices; and
a component is not available in stock or in the stock of replacement parts.

11. The non-transitory computer readable medium according to claim 10, wherein the computer program instructions when executed by computer arranged as an analysis unit programmed with the instructions cause the analysis unit to:
display a maintenance status of the components of the installation which are to be classified as hardware, of each item of associated software and an IT security status on a graphic user interface.

\* \* \* \* \*